(12) United States Patent
Wakabayashi

(10) Patent No.: US 8,376,625 B2
(45) Date of Patent: Feb. 19, 2013

(54) ROLLING BEARING UNIT FOR WHEEL SUPPORT

(75) Inventor: Tatsuo Wakabayashi, Fujisawa (JP)

(73) Assignee: NSK Ltd., Tokyo (JP)

( * ) Notice: Subject to any disclaimer, the term of this patent is extended or adjusted under 35 U.S.C. 154(b) by 495 days.

(21) Appl. No.: 12/438,961

(22) PCT Filed: Aug. 30, 2007

(86) PCT No.: PCT/JP2007/066927
§ 371 (c)(1),
(2), (4) Date: Feb. 26, 2009

(87) PCT Pub. No.: WO2008/026703
PCT Pub. Date: Mar. 6, 2008

(65) Prior Publication Data
US 2009/0263066 A1    Oct. 22, 2009

(30) Foreign Application Priority Data
Aug. 31, 2006    (JP) .................................. 2006-235749

(51) Int. Cl.
*F16C 33/58* (2006.01)
*F16C 19/18* (2006.01)
(52) U.S. Cl. .......................... 384/544; 384/513; 384/625
(58) Field of Classification Search .................. 384/512, 384/513, 516, 544, 625
See application file for complete search history.

(56) References Cited

U.S. PATENT DOCUMENTS
3,937,535 A    2/1976    Ladin
7,614,796 B2 *    11/2009    Hattori et al. ................. 384/544

FOREIGN PATENT DOCUMENTS

| JP | 3-22124 U | 3/1991 |
|---|---|---|
| JP | 11248726 A | 9/1999 |
| JP | 2003156054 A | 5/2003 |
| JP | 2003-232343 A | 8/2003 |
| JP | 2004-108449 A | 4/2004 |
| JP | 2004-345439 A | 12/2004 |
| JP | 2005214229 A | 8/2005 |
| JP | 2005-273870 A | 10/2005 |
| JP | 2005-325903 A | 11/2005 |
| JP | 2006-137365 A | 6/2006 |
| WO | 2005-065077 A2 | 7/2005 |

OTHER PUBLICATIONS

Extended European Search Report issued on Mar. 21, 2011 in the corresponding European Patent Application No. 07806404.5.
Office Action dated Aug. 14, 2012 issued by the Japanese Patent Office in counterpart Japanese Application No. 2006-235749.

*Primary Examiner* — William C Joyce
(74) *Attorney, Agent, or Firm* — Sughrue Mion, PLLC

(57) ABSTRACT

A wheel supporting roller bearing in which a pitch circle diameter of an outboard row is larger than a pitch circle diameter of an inboard row. Thermally-hardened layers are formed, at two locations along an axial direction, in portions of an inner circumferential surface of an outer ring including outer ring raceways. The thermally-hardened layers are separated from each other by an unhardened portion in an axially middle portion of the outer ring. A non-cylindrical curved portion having an arcuate generatrix is provided on the axially middle portion of the inner circumferential surface of the outer ring between the outer ring raceways. A thickness of the thermally-hardened layer in the portion including the outer ring raceway on an axially outer side is larger than a thickness of the thermally-hardened layer in the portion including the outer ring raceway on the axially inner side.

1 Claim, 4 Drawing Sheets

ROLLING BEARING UNIT FOR WHEEL SUPPORT

TECHNICAL FIELD

The present invention relates to an improvement in a wheel supporting rolling bearing unit which is used to rotatably support a wheel and a braking rotating member, such as a brake rotor, of a vehicle with respect to a suspension device.

BACKGROUND ART

A wheel and a braking rotating member of a vehicle are rotatably supported with respect to a suspension device by a wheel supporting rolling bearing unit. Upon cornering of the vehicle, a large moment is applied to the wheel supporting rolling bearing unit. Thus, in order to maintain stability during the cornering, high moment rigidity needs to be ensured for such a wheel supporting rolling bearing unit. Accordingly, a configuration in which rolling elements are arranged in double rows and preload as well as back-to-back duplex type contact angles are given to the respective rows of the rolling elements has generally been adopted in conventional rolling bearing units for wheel support. Further, in recent years, in order to ensure high moment rigidity without increasing a size, there have been proposed some configurations as disclosed, for example, in Patent Documents 1 to 5 in which pitch circle diameters or rolling element diameters are designed to be different between the respective rows of rolling elements.

FIG. 4 shows a configuration disclosed in Patent Document 4. This wheel supporting rolling bearing unit 1 includes a hub 2, an outer ring 3 and a plurality of balls 4, 4 which are rolling elements. The hub 2 includes a combination of a hub body 5 and an inner ring 6. The hub 2 is formed with an attaching flange 7, by which a wheel and a braking rotating member is supported, on an axially outer side portion thereof, and double rows of inner ring raceways 8a, 8b on an axially middle portion and an axially inner side portion thereof respectively (in the following description and the claims, the axially outer side is an outer side in a width direction of an assembled vehicle, i.e. the left side in the drawings, and the axially inner side is a central side in the vehicle width direction, i.e. the right side in the drawings). Between the inner ring raceways 8a, 8b, a diameter of the inner ring raceway 8a on the axially outer side is larger than a diameter of the inner ring raceway 8b on the axially inner side. Base ends of a plurality of studs 15 are fixed to the attaching flange 7 so that the braking rotating member, such as a disc, or the wheel can be fixedly supported by the attaching flange 7.

In order to make the diameters of the respective inner ring raceways 8a, 8b different from each other, in the configuration shown in FIG. 4, an outer circumferential slanted step 9 is formed on an outer circumferential surface of an axially middle portion of the hub body 5 which is slightly on an axially inner side of the inner ring raceway 8a on the outer side. The outer circumferential slanted step 9 is slanted such that an outer diameter thereof gradually decreases toward the axially inner side direction. In addition, a smaller-diameter step 10 is formed on an axially inner side portion of the hub body 5 which is on an axially inner side of the outer circumferential slanted step 9. The inner ring raceway 8b on the axially inner side is formed on an outer circumferential surface of the inner ring 6. The inner ring 6 is fitted on the smaller-diameter step 10, and the inner ring 6 is fixedly coupled to the hub body 5 by a riveted portion 11 formed on an axially inner end portion of the hub body 5. Each of the inner ring raceways 8a, 8b has an arcuate cross section (a generatrix shape), and the outer diameters of the respective inner ring raceways 8a, 8b decrease as they become close to each other (toward the axially middle portion of the hub 2).

The outer ring 3 includes double rows of outer ring raceways 12a, 12b formed on an inner circumferential surface thereof and a coupling flange 13 formed on an outer circumferential surface thereof for fixedly coupling the outer ring 3 to a suspension device. Between the outer ring raceways 12a, 12b, a diameter of the outer ring raceway 12a on the axially outer side is larger than a diameter of the outer ring raceway 12b on the axially inner side. Accordingly, in the configuration shown in FIG. 4, an inner circumferential slanted step 14 is formed on an inner circumferential surface of an axially middle portion of the outer ring 3 which is on an axially inner side of the outer ring raceway 12a on the axially outer side. The inner circumferential slanted step 14 is slanted such that an inner diameter thereof decreases toward the axially inner side direction. Each of the outer ring raceways 12a, 12b has an arcuate cross section (a generatrix shape), and the inner diameters of the respective outer ring raceways 12a, 12b decrease as they become close to each other (toward the axially middle portion of the hub 2).

Between the inner ring raceways 8a, 8b and the outer ring raceways 12a, 12b, the balls 4, 4 are rollably arranged respectively. In this state, preload as well as back-to-back duplex type (DB type) contact angles are given to the respective balls 4, 4 arranged in double rows. Pitch circle diameters of the respective rows of balls 4, 4 are different from each other in accordance with the difference of the diameters between the inner ring raceways 8a, 8b and between the outer ring raceways 12a, 12b. That is, a pitch circle diameter $PCD_{OUT}$ of the balls 4, 4 in the axially outer side row (outboard row) is larger than a pitch circle diameter $PCD_{IN}$ of the balls 4, 4 in the axially inner side row (inboard row) ($PCD_{OUT} > PCD_{IN}$). Although, the balls 4, 4 are used as the rolling elements in the example shown in the drawing, tapered rollers may be used as the rolling elements in case where a rolling bearing unit is for a heavy-weight vehicle.

Configurations of the wheel supporting rolling bearing unit disclosed in Patent Documents 1 to 5, in which pitch circle diameters of the rolling elements in respective rows are different from each other, are as described above. According to such a configuration, moment rigidity can increased in accordance with an increase of the pitch circle diameter $PCD_{OUT}$ of the outboard row, whereby a design for improving running stability during the cornering and durability of the wheel supporting rolling bearing unit can be easily made. The pitch circle diameter $PCD_{IN}$ of the inboard row, on the other hand, does not need to be increased. Thus, a diameter of a portion (an attachment hole of a knuckle) of the suspension device does not need to be increased in particular. Accordingly, the running stability and the durability can be improved without increasing a size of such a portion of the suspension device.

Patent Document 6 discloses a configuration in which pitch circle diameters of the rolling elements in respective rows are equal to each other, further in which thermally-hardened layers are separately or continuously formed in portions including outer ring raceways.

Patent Document 1: JP 2003-232343 A
Patent Document 2: JP 2004-108449 A
Patent Document 3: JP 2004-345439 A
Patent Document 4: JP 2006-137365 A
Patent Document 5: WO/2005/065077
Patent Document 6: JP 3-22124 U

DISCLOSURE OF THE INVENTION

Problems to be Solved by the Invention

In order to ensure sufficient durability of the wheel supporting rolling bearing unit as shown in FIG. 4, a range in which thermally-hardened layers exist in portions including the respective outer ring raceways 12a, 12b needs to be considered. Description in this respect will be given below. As is apparent from FIG. 4, a thickness of the outer ring 3, the inner circumferential surface of which being formed with the outer ring raceways 12a, 12b, in a radial direction is significantly different between the axially outer half and the axially inner half. More specifically, a thickness $T_{OUT}$ of the axially outer half portion corresponding to the outboard row having the larger pitch circle diameter $PCD_{OUT}$ is smaller than ($T_{OUT} < T_{IN}$) a thickness $T_{IN}$ of the axially inner half portion corresponding to the inboard row having the smaller pitch circle diameter $PCD_{IN}$. Accordingly, without any consideration of heat treatment conditions for forming the hardened layers in portions including the outer ring raceways 12a, 12b, distortion of the outer ring 3 is likely to be generated.

In the configuration in which the pitch circle diameter $PCD_{OUT}$ of the outboard row and the pitch circle diameter $PCD_{IN}$ of the inboard row are different from each other as shown in FIG. 4, functions of the respective outer ring raceways 12a, 12b are somewhat different from those of outer ring raceways of general wheel supporting rolling bearing unit in which pitch circle diameters of the respective rows are equal to each other. More specifically, more than half of a radial load to be applied during straight-ahead or substantially straight-ahead driving is supported by the inboard row balls 4, 4 between the inner ring raceway 8b and the outer ring raceway 12b. In contrast, more than half of the moment to be applied during the cornering is supported by the outboard row balls 4, 4 between the inner ring raceway 8a and the outer ring raceway 12a. In order to obtain best performance in the configuration shown in FIG. 4, hardness and thickness of the thermally-hardened layers in portions including the outer ring raceways 12a, 12b need to be appropriately controlled so as to correspond to the difference of the roles of the respective rows.

However, none of Patent Documents 1 to 5 discuss such matters. Even in the technique disclosed in Patent Document 6, there are no suggestions to appropriately set characteristics of thermally-hardened layers in portions including the outer ring raceways with the configuration in which the pitch circle diameters of the rolling elements of the respective rows are different from each other.

In view of the above-described circumstances, the present invention has been made in order to achieve best performance in a wheel supporting rolling bearing unit configured to improve moment rigidity by designing a pitch circle diameter of an outboard row to be larger than a pitch circle diameter of an inboard row.

Means for Solving the Problems

A wheel supporting rolling bearing unit according to the present invention includes, similarly to the conventional configuration shown in FIG. 4, an outer ring, a hub, and a plurality of rolling elements.

The outer ring is made of carbon steel and has double rows of outer ring raceways on an inner circumferential surface thereof.

The hub has an attaching flange on an axially outer end portion of an outer circumferential surface thereof for supporting and fixing the wheel thereto and double rows of inner ring raceways on an axially middle portion and an axially inner end portion thereof.

The plurality of rolling elements is arranged in each of the rows between the inner ring raceways and the outer ring raceways with a preload and back-to-back duplex type contact angles given thereto.

A pitch circle diameter of the row on axially outer side is larger than a pitch circle diameter of the row on axially inner side.

Specifically, according to the wheel supporting rolling bearing unit of the present invention, thermally-hardened layers are formed, at two locations along an axial direction, in portions, including the outer ring raceways, of the inner circumferential surface of the outer ring.

The thermally-hardened layers in the portions including the outer ring raceways are separated from each other by an unhardened portion in an axially middle portion of the inner circumferential surface of the outer ring.

According to a preferable embodiment of the wheel supporting rolling bearing unit of the present invention, as recited claim 2, a non-cylindrical curved portion having an arcuate generatrix may be provided on the axially middle portion of the inner circumferential surface of the outer ring and between the outer ring raceways.

Further, as recited in claim 3, a thickness of the thermally-hardened layer in the portion including the outer ring raceway on the axially outer side may be larger than a thickness of the thermally-hardened layer in the portion including the outer ring raceway on the axially inner side.

Further, as recited in claims 4 and 5, the rolling elements in both of the rows may be balls.

Further, as recited in claim 4, a diameter of the balls in the row on the axially outer side may be smaller than a diameter of the balls in the row on the axially inner side, and a number of the balls in the row on the axially outer side may be greater than a number of the balls in the row on the axially inner side.

Further, as recited in claim 5, the pitch circle diameters of the respective rows of balls may be smaller than six times the diameter of the balls in the corresponding one of the rows.

Advantages of the Invention

According to the wheel supporting rolling bearing unit of the present invention having the above-described configuration, it is possible to obtain best performance in the configuration in which the pitch circle diameter of the outboard row is set to be larger than the pitch circle diameter of the inboard row to improve moment rigidity.

That is, because the thermally-hardened layers in the portions including the outer ring raceways are designed to be separated from each other by the unhardened portion in the axially middle portion, heat treatment can be performed with optimal conditions for each of the hardened layers in the portions including the outer ring raceways. Accordingly, the characteristics of the hardened layers in the portions including the outer ring raceways can be made suitable for respective use conditions.

In addition, it is possible to suppress deformation of the outer ring to be caused by forming the hardened layers in the portions including the outer ring raceways, thereby reducing cost required for a finish processing after the heat treatment for forming the hardened layers to arrange the shape of the outer ring.

In particular, if the non-cylindrical curved portion is provided between the outer ring raceways as recited in claim 2, a heat transfer length between the outer ring raceways can be made longer and a heat radiation area between the outer ring raceways can be made larger, whereby heat caused by heat treatment is less transferred between the outer ring raceways.

Accordingly, it becomes easier to control the thermally-hardened layers in the portions including the outer ring raceways independently to have optimal characteristics respectively. That is, the thermally-hardened layers in the portions including the outer ring raceways can be controlled to have more optimal characteristics respectively. In this case, if the generatrix of the non-cylindrical curved portion is designed to have a smooth arcuate shape, the outer ring can be prevented from partially and excessively being stressed (a stress can be dampened) by a moment input from the rolling elements to the portions including the outer ring raceways of the outer ring.

Upon controlling the thermally-hardened layers in the portions including the outer ring raceways to have the optimal characteristics respectively, if the thickness of the thermally-hardened layer in the portion including the outer ring raceway on the axially outer side is larger than the thickness of the thermally-hardened layer in the outer ring raceway of the axially inner side as recited in claim 3, it is possible to improve indentation resistance of the outer ring raceway of the outboard row and to improve rolling fatigue life of the outer ring raceway of the inboard row. That is, as described above, more than half of a radial load is supported by the inboard row during a straight-ahead or substantially straight-ahead driving, whereas more than half of a moment is supported by the outboard row during the cornering. Accordingly, it is preferable that rolling fatigue life under normal use conditions be ensured with respect to the outer ring raceway of the inboard row and that the indentation resistance under a condition in which a large moment is applied be ensured with respect to the outer ring raceway of the outboard row.

As is apparent from the Hertz theory which is well known in the field of rolling bearings, dynamic shear stress $\tau_o$ is dominant in the rolling fatigue life whereas static shear stress $\tau_{st}$ is dominant in the indentation resistance under an excessive load input. A point at which maximum static shear stress $\tau_{st}$ is generated is about 1.5 times deeper than a point at which maximum dynamic shear stress $\tau_o$ is generated.

Like in the present invention, in the wheel supporting rolling bearing unit in which the pitch circle diameter of the outboard row is larger than the pitch circle diameter of the outboard row, the thickness of the outer ring in a radial direction is larger in a portion corresponding to the outer ring raceway of the inboard row than a portion corresponding to the outer ring raceway of the outboard row.

When forming the hardened layers in the portions including the outer ring raceways by heat treatment such as induction hardening, metallographic structure of the hardened layers slightly expands due to martensitic transformation. In such a case, if there is an unhardened portion (not expanded by the martensitic transformation) around the hardened layer, the hardened layer is biased by the unhardened portion whereby residual compression stress is generated thereinside. This residual compression stress advantageously acts to ensure the rolling fatigue life and to improve the indentation resistance. The amount of the residual compression stress increases as a thickness of the unhardened portion around the hardened layer increases.

In consideration of above, it is preferable that the thermally-hardened layer in the outer ring raceway of the inboard row be controlled to have the most advantageous thickness in respect to the dynamic shear stress $\tau_o$ be generated by a radial load applied during a straight-ahead or substantially straight-ahead driving. More specifically, it is preferable that the thicknesses of the thermally-hardened layer in the outer ring raceway of the inboard row be slightly larger than a depth corresponding to the maximum value of the dynamic shear stress $\tau_o$ to be generated by the radial load applied during a straight-ahead or substantially straight-ahead driving. Accordingly, the thickness of the thermally-hardened layer in the outer ring raceway of the inboard row does not need to be so large. The reason is that, because of a relatively thick unhardened portion around the thermally-hardened layer in the outer ring raceway of the inboard row, and a relatively large residual compression stress is generated in the thermally-hardened layer.

On the other hand, it is preferable that the thermally-hardened layer in the outer ring raceway of the outboard row be designed to have a sufficient thickness in accordance with the static shear stress $\tau_{st}$ in order to ensure the indentation resistance at the time when an excessive load is input due to the moment caused by the cornering.

As recited in claim 3, if the thickness of the thermally-hardened layer in the portion including the outer ring raceway on the axially outer side is larger than the thickness of the thermally-hardened layer in the portion including the outer ring raceway of the axially inner side, it is possible to improve indentation resistance of the outer ring raceway of the outboard row and to improve rolling fatigue life of the outer ring raceway of the inboard row.

In such a case, the configuration in which the thickness of the outer ring in the radial direction is smaller in the portion corresponding to the outer ring raceway of the outboard row than in the portion corresponding to the outer ring raceway of the inboard row is advantageous in terms of forming the thermally-hardened layer in the portion including the outer ring raceway on the axially outer side thicker than the thermally-hardened layer in the outer ring raceway on the axially inner side. This is because it is easier to increase the thickness of the thermally-hardened layer if the thickness of the portion is smaller, i.e. if a heat capacity thereof is smaller. Thus, the coupling flange formed on the outer circumferential surface of the outer ring increases the heat capacity of the corresponding portion and acts to suppress the thickness of the thermally-hardened layer in the portion including the outer ring raceway of the axially inner side which exists in a radially inner side of the coupling flange.

The thickness difference between the thermally-hardened layers of the outer ring raceways of the outboard row and the inboard row is determined in accordance with a design of the shape and the thickness of the outer ring, nevertheless, the absolute value thereof is not so large. That is, in most cases, it is sufficient that the difference value be a small value of about 0.2 to 0.3 mm. The thickness difference between the thermally-hardened layers is based on a distance from a surface of each of the outer ring raceways (a portion which is in rolling contact with rolling surfaces of the rolling elements) to a depth having a previously set hardness value (e.g., a distance along which higher hardness at the surface gradually decreases to reach Hv 500).

If the rolling elements of both of the rows are balls and the diameter of the balls in the row on the axially outer side is smaller than the diameter of the balls in the row on the axially inner side as recited in claim 4, it is possible to increase the number of balls in the outboard row to be greater than the number of balls in the inboard row while suppressing the increase of the pitch circle diameter of the outboard row, whereby the moment rigidity can be further improved. If a size of a contact ellipse of the rolling surfaces of the balls becomes different between the respective rows by changing the diameters of the balls between the respective rows, the optimal thickness of the thermally-hardened layer in the outer ring raceway becomes different between the respective rows. In such a case, if the thermally-hardened layers in the respective outer ring raceways are separated from each other like in the present invention, it is easier to provide an optimal thickness for each of the thermally-hardened layers in the outer ring raceways.

According to an implementation of the present invention, moreover, excellent effect can be obtained with relatively small rolling bearing units for wheel support in which the pitch circle diameters of the respective rows of balls are smaller than six times the diameter of the balls in the corresponding one of the rows as recited in claim 5. That is, in relatively large rolling bearing units for supporting a wheel, in most cases, it is possible to ensure required rolling fatigue life or indentation resistance without applying the present invention.

EXPLANATION OF REFERENCE NUMERALS

Figure 1:
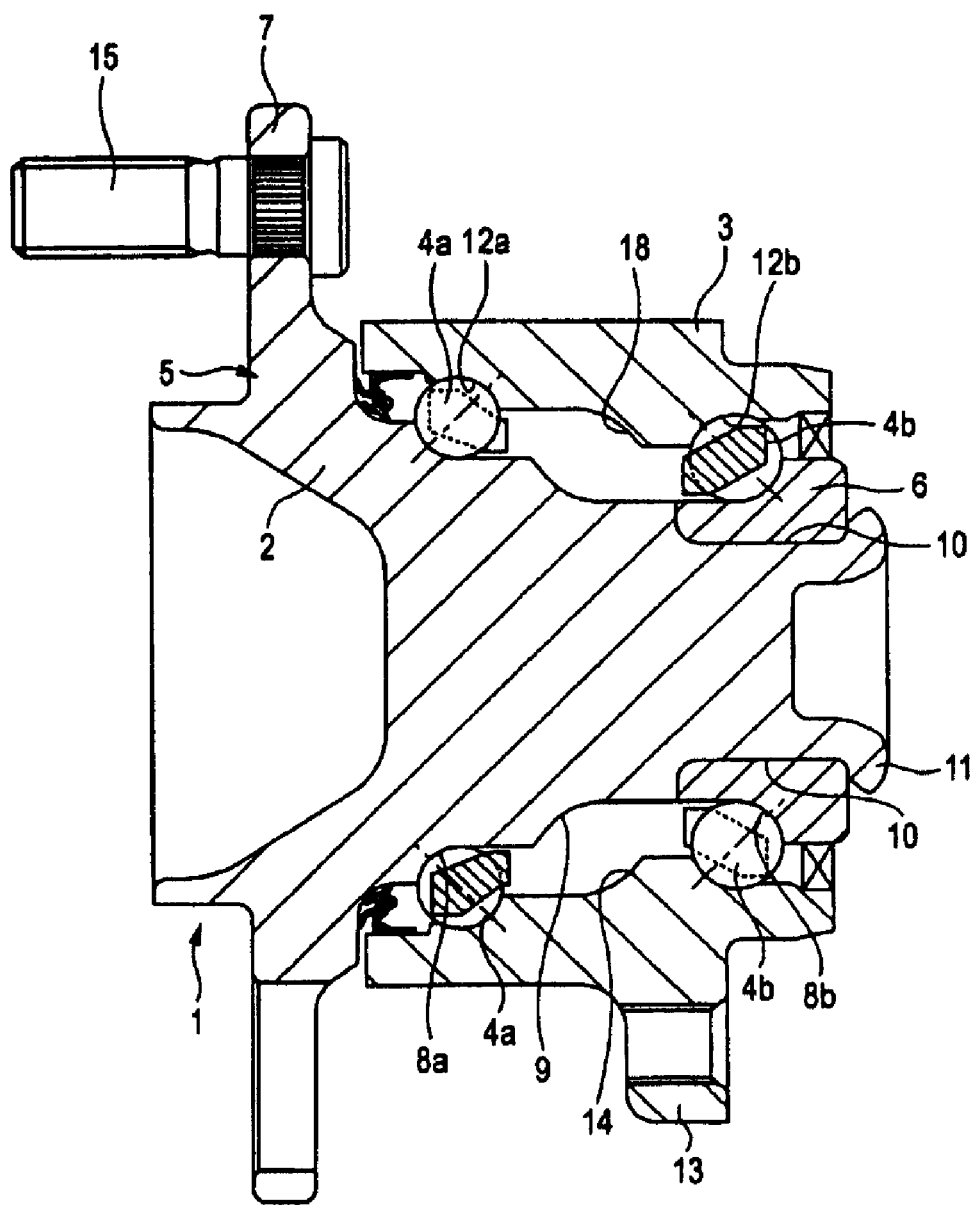
FIG. 1 is a cross-sectional view illustrating an example of an embodiment of the present invention.

1: rolling bearing unit for supporting a wheel
2: hub
3: outer ring
4, 4a, 4b: balls
5: hub body
6: inner ring
7: attaching flange
8a, 8b: inner ring raceways
9: outer circumferential slanted step
10: smaller-diameter step
11: riveted portion
12a, 12b: outer ring raceways
13: coupling flange
14: inner circumferential slanted step
15: studs
16a, 16b: thermally-hardened layers
17: unhardened portion
18: non-cylindrical curved portion
19: thermally-hardened layer
20: groove shoulder portion

BEST MODE FOR CARRYING OUT THE INVENTION

Figure 2:
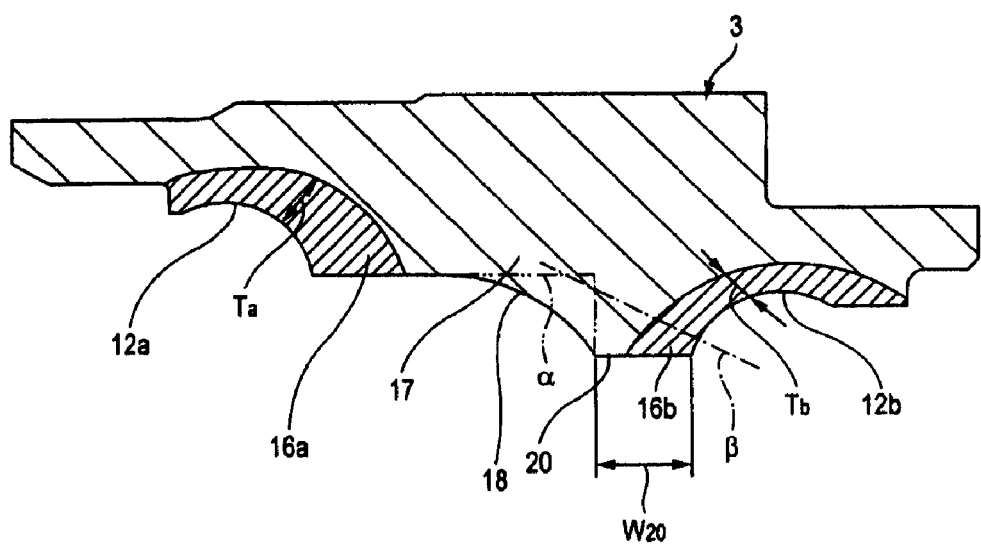
FIG. 2 is a partial cross-sectional view of an outer ring for illustrating a range of thermally-hardened layers on portions including outer ring raceways.
Figure 3:
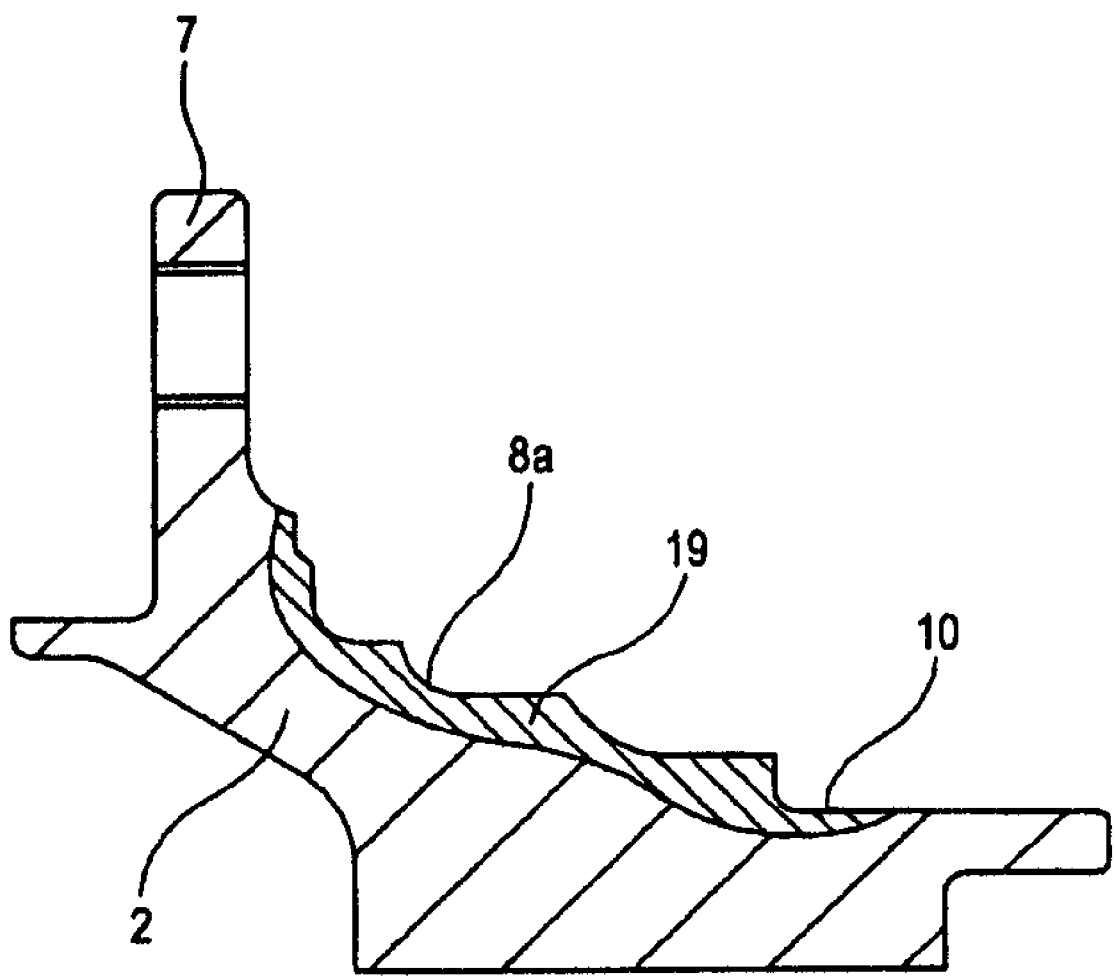
FIG. 3 is a partial cross-sectional view of a hub body for illustrating a range of a thermally-hardened layer on a portion including an inner ring raceway and a smaller-diameter step.
Figure 4:
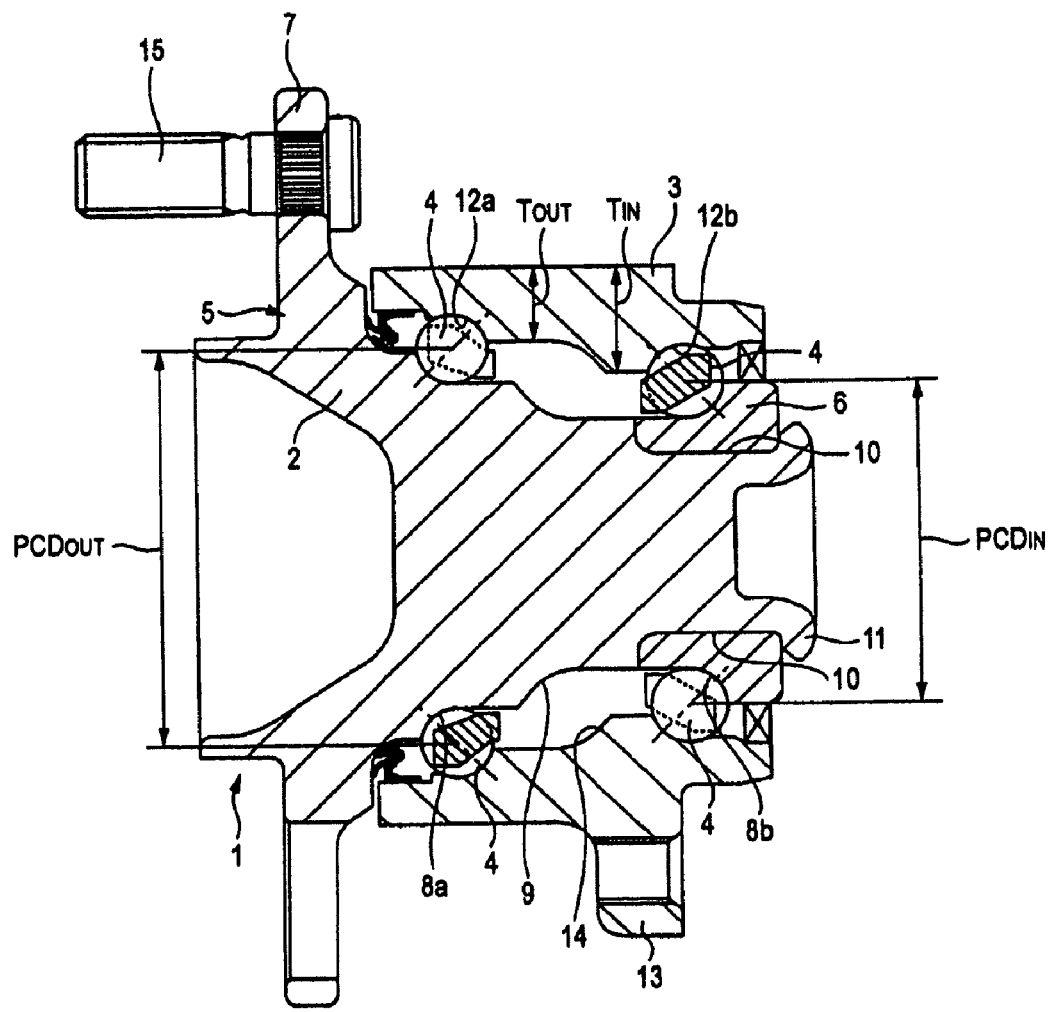
FIG. 4 is a cross-sectional view illustrating an example of a conventional configuration.

FIGS. 1 to 3 show an example of an embodiment of the present invention corresponding to all of the claims. The present invention is characterized in that thermally-hardened layers 16a, 16b formed in portions including double rows of outer ring raceways 12a, 12b on an inner circumferential surface of an outer ring 3 are independent from each other to obtain optimal characteristics respectively. According to the example shown in the drawings, a diameter of balls 4a, 4a in an outboard row (e.g., about 10.3 mm) is smaller than a diameter of balls 4b, 4b in an inboard row (e.g., about 11.1 mm), and the number of the balls 4a, 4a of the outboard row (e.g., fifteen) is greater than the number of the balls 4b, 4b in the inboard row (e.g., eleven). Correspondingly, a radius of curvature of cross sectional shapes (generatrices) of an inner ring raceway 8a and an outer ring raceway 12a of the outboard row is smaller than a radius of curvature of cross sectional shapes of an inner ring raceway 8b and an outer ring raceway 12b of the inboard row. A pitch circle diameter of the balls 4a, 4a of in outboard row is, for example, 60 mm, and a pitch circle diameter of the balls 4b, 4b in the inboard row is, for example, 50 mm. The pitch circle diameters of the respective rows of balls 4a, 4b are smaller than six times the diameters of the balls 4a, 4b in the corresponding one of the rows. Hereinafter, explanation of configurations and effects of portions similar to those in the conventional structure shown in FIG. 4 will be omitted or simplified, and the characterizing portion of the example of the present invention will be primarily explained.

As shown in FIG. 2, the thermally-hardened layers 16a, 16b (portions indicated by oblique lattice) are partially formed in an axial direction, i.e., in portions, including the double rows of outer ring raceways 12a, 12b, of an inner circumferential surface of the outer ring 3, around the entire circumference thereof, by induction hardening. The thermally-hardened layers 16a, 16b are formed by independent high-frequency heat treatments. However, forming processes of the respective thermally-hardened layers 16a, 16b need not be temporally shifted, and may be simultaneously performed by using high-frequency heating coils that are separately controllable.

A range of each of the thermally-hardened layers 16a, 16b in the outer ring raceways 12a, 12b is controlled such that contact ellipses at rolling contact portions between the outer ring raceways 12a, 12b and rolling surfaces of the balls 4a, 4b do not run out from the respective thermally-hardened layers 16a, 16b, regardless of a moment or an axial load applied to the wheel supporting rolling bearing unit.

A thickness $T_a$ of the thermally-hardened layer 16a in the portion including the outer ring raceway 12a on the axially outer side is larger than a thickness $T_b$ of the thermally-hardened layer 16b in the portion including the outer ring raceway 12b on the axially inner side ($T_a > T_b$). Further, in an axially middle portion of the inner circumferential surface of the outer ring 3, an unhardened portion 17 is provided between the thermally-hardened layers 16a, 16b in the portions including the outer ring raceways 12a, 12b. Accordingly, the thermally-hardened layers 16a, 16b are separated from each other by the unhardened portion 17. In this example, the unhardened portion 17 is provided in a portion including a non-cylindrical curved portion 18 having an arcuate generatrix, which is formed on the axially middle portion of the inner circumferential surface of the outer ring 3 between the outer ring raceways 12a, 12b.

A groove shoulder portion 20 having a cylindrical surface shape is provided on a portion of the inner circumferential surface of the middle portion of the outer ring 3, between the non-cylindrical curved portion 18 and the outer ring raceway 12b on the axially inner side. Because a heat capacity of an end portion of the groove shoulder portion 20 in the axial direction of the outer ring 3 is smaller than a heat capacity of other portions of the outer ring 3, a temperature of the end portion of the groove shoulder portion 20 is more likely to increase than the other portions. If the temperature is excessively increased (overheated), strength of a porting including the groove shoulder portion 20 deteriorates due to coarsening of microstructure, whereby rolling fatigue life of the outer ring raceway 12b on the axially inner side which is adjacent to the groove shoulder portion 20 is degraded. Therefore, in order to prevent overheat at the time of induction hardening, a width $W_{20}$ of the groove shoulder portion 20 has a size that is necessary to ensure a certain heat capacity. More specifically, the width $W_{20}$ is larger than the thickness of the thermally-hardened layer 16b in the portion including the outer ring raceway 12b on the axially inner side so that the thermally-hardened layer 16b does not reach an outer edge of the groove shoulder portion 20.

A radius of curvature of the non-cylindrical curved portion 18 is controlled in view of ensuring strength and rigidity of the outer ring 8 as well as reducing a weight of the outer ring 3. When considering only the reduction of weight, a portion adjacent to the groove shoulder portion 20 on the axially outer side can be designed to have a shape as shown in a dot-dash-line α in FIG. 2, i.e., a shape formed by a right-angle intersection of a cylindrical surface and a circular ring surface extending along a direction perpendicular to a central axis of the outer ring 3. However, if such a shape is employed, stress is concentrated at an intersecting portion between the circular ring surface and the cylindrical surface when the moment is applied to the outer ring 3 so that the intersecting portion becomes likely to be damaged, such as cracking. Further, in a case where a contact angle between the balls 4b, 4b and the outer ring raceways 12b on the axially inner side is increased as shown in a dot-dash-line β in FIG. 2 due to a large axial load applied to the wheel supporting rolling bearing unit, an action line of the load along a direction of the dot-dash-line β passes through a cut-out portion of the outer ring 3 (i.e., axially outer side of the circular ring surface and radially inner side of the cylindrical surface). This state is not preferable because it causes a decrease in supporting rigidity by the balls 4b, 4b in the inboard row a generation of a partial excessive stress in the outer ring 3. In consideration of the above, the radius of curvature of the non-cylindrical curved portion 18 is preferably controlled such that, even when the contact angle is increased, a line along the contact angle extends through a radially inner side of the outer circumferential surface of the outer ring 3 without extending toward the outer side of the outer ring 3.

On the other hand, as for the outer circumferential surface of the hub body 5 made of carbon steel, as shown in FIG. 3, a thermally-hardened layer 19 (a portion indicated by oblique lattice) is continuously formed in the axial direction and along the entire circumference thereof, in a portion, including the inner ring raceway 8a on the axially outer side, from an inner side surface of a base end portion of an attaching flange 7 to a smaller-diameter step 10. This quench-hardened layer 19 is also formed by induction hardening. An inner ring 6, which is made of bearing steel and is entirely hardened by quenching (so-called immersion quenching), is fitted onto the smaller-diameter step 10, and is fixedly coupled to the hub body 5 by a riveted portion 11.

For the reasons explained in the section of [ADVANTAGES OF THE INVENTION], the wheel supporting rolling bearing unit of the example configured as described above can obtain best performance in a configuration in which moment rigidity can be improved by setting the pitch circle diameter of the outboard row to be larger than the pitch circle diameter of an inboard row.

The present application is based on Japanese Patent Application No. 2006-235749 filed on Aug. 31, 2006, the content of which is incorporated herein by reference.

The invention claimed is:

1. A wheel supporting bearing unit comprising:
an outer ring made of carbon steel and comprising double rows of outer ring raceways on an inner circumferential surface thereof;
a hub comprising an attaching flange on an axially outer end portion of an outer circumferential surface thereof for supporting and fixing a wheel thereto, and double rows of inner ring raceways on an axially middle portion and an axially inner end portion thereof; and
a plurality of balls arranged in each of the rows between the inner ring raceways and the outer ring raceways with a preload and back-to-back duplex type contact angles given thereto,
wherein a pitch circle diameter of the row on axially outer side is larger than a pitch circle diameter of the row on axially inner side,
wherein thermally-hardened layers are formed, at two locations along an axial direction, in portions, including the outer ring raceways, of the inner circumferential surface of the outer ring,
the thermally-hardened layers in the portion including the outer ring raceways are separated from each other by an unhardened portion in an axially middle portion of the inner circumferential surface of the outer ring,
a non-cylindrical curved portion having an arcuate generatrix is provided on the axially middle portion of the inner circumferential surface of the outer ring and between the outer ring raceways such that an extension line of the contact angle between the balls and the outer ring raceway on the axially inner side does not intersect the axially middle portion of the inner circumferential surface of the outer ring even if an axial load is applied,
a thickness of the thermally-hardened layer in the portion including the outer ring raceway on the axially outer side is larger than a thickness of the thermally-hardened layer in the portion including the outer ring raceway on the axially inner side,
a diameter of the balls in the row on the axially outer side is smaller than a diameter of the balls in the row on the axially inner side, and a number of the balls in the row on the axially outer side is greater than a number of the balls in the row on the axially inner side,
the pitch circle diameters of the respective rows of balls are smaller than six times the diameter of the balls in the corresponding one of the rows,
wherein the thickness of the thermally-hardened layer in the portion including the outer ring raceway on the axially outer side is set to improve indentation resistance of the outer ring race,
wherein the thickness of the thermally-hardened layer in the outer ring raceway of the axially inner side is set to improve rolling fatigue life of the outer ring raceway,
wherein the thickness difference between the thermally-hardened layers of the outer ring raceways of the outboard row and the inboard row is in a range from 0.2 mm to 0.3 mm,
wherein the thickness of the thermally-hardened layer in the portion including the outer ring raceway on the axially outer side is set to improve indentation resistance of the outer ring raceway, and
wherein the thickness of the thermally-hardened layers in the outer ring raceway of the axially inner side is set to improve rolling fatigue life of the outer ring raceway.

* * * * *